United States Patent [19]

House

[11] Patent Number: 5,188,064
[45] Date of Patent: Feb. 23, 1993

[54] CLUMPING CAT LITTER

[75] Inventor: Roy F. House, Houston, Tex.

[73] Assignee: Venture Innovations, Inc., Lafayette, La.

[21] Appl. No.: 772,142

[22] Filed: Oct. 7, 1991

[51] Int. Cl.⁵ ............................................. A01K 1/015
[52] U.S. Cl. ..................................... 119/172; 119/173
[58] Field of Search ......................... 119/171, 172, 173

[56] References Cited

U.S. PATENT DOCUMENTS 5,014,650  5/1991  Sowle et al. .......................... 119/171

FOREIGN PATENT DOCUMENTS 165820   12/1915  European Pat. Off. ............ 119/172
94043    5/1985   Japan ................................... 119/173
8303255  9/1983   PCT Int'l Appl. .................. 119/171

Primary Examiner—John G. Weiss

[57] ABSTRACT

The invention provides a method of increasing the sorption capacity of smectite clays which exhibit osmotic swelling such as montmorillonite clays having predominately sodium as the exchangeable cation. The invention further provides a clumping cat litter having excellent cohesiveness comprising certain mixtures of a clay which exhibits osmotic swelling, a cellulosic material, and optionally a density controlling material, the clay, the cellulose material, and the density controlling material having certain particle size distributions, and the cat litter having a bulk density in the range from about 0.54 to about 0.96 g/cc and a sorption capacity greater than about 1.0 cc/g, wherein the concentration of the smectite clay is such that upon wetting the litter the cohesiveness of the lump of wetted litter is sufficient to allow its removal from a litter box, and wherein the concentration of the smectite clay is insufficient to prevent the lump of wetted litter from disintegrating in water over time.

16 Claims, No Drawings

CLUMPING CAT LITTER

FIELD OF THE INVENTION

The invention pertains to a method of deodorizing animal wastes, and more particularly the excreta from pets, such as cats.

BACKGROUND OF THE INVENTION

Heretofore, many efforts have been made to develop an effective and inexpensive litter for animals, especially household pets, particularly cats. Thus it has been disclosed in various patents to use alone or in various combinations urine sorptive materials, odor-inhibiting or control chemicals or materials, antioxidants, microbial inhibitors, surfactants, dyes, antistatic agents, flame retardants, binders, encapsulants, neutralizing agents, weighting or density control agents, and other materials. Representative of the many materials disclosed to provide one or more of these characteristics are: siliceous minerals such as natural or synthetic clays (bentonite, attapulgite, fuller's earth, sepiolite, kaolin), diatomaceous earth, mica, talc, sand, finely divided quartz, vermiculite, perlite, fly ash, pumice, zeolite molecular sieves, opalite, bottom ash, boiler slag, synthetic porous silicas and silicates, hydrophobic microporous crystalline tectosilicates of regular geometry having aluminum-free sites in a siliceous lattice, and the like; natural or agriculturally-grown materials and by-products thereof, such as chlorophyll-containing materials (alfalfa, algae, broome grass, timothy grass, metallic chlorophyllin salts, stems and leaves of leaf meal such as ipilipil niseacacia, etc.), peanut shells, cedar, wood shavings, sawdust, wood flour, bagasse, corncobs, sugar beet pulp, citrus pulp, alphacellulose fiber stock, sulphite cellulosic paper stock, waste paper, paper sludge, hay, husks, bark, straw, gelatinizable carbohydrates, sunflower hulls, partially pyrolyzed cellulosic materials, sagebrush, sorghum, cotton seed hulls, popcorn, peat moss, tomato pumice, grain, potato, cereal or grain hulls such as corn, rice, wheat, oats, and the like, apple pulp and grape pulp; foamed plastics (polystyrene, polyurethanes, phenolic resins, cellular cellulose acetate, etc.); porous plastic beads; cloth; synthetic sorptive granules based on commercial grade plaster (calcium sulfate dihydrate); wax or paraffin coated hydrophobic substantially nonabsorbent and nonwater wettable granular material; porous inorganic material which has been uniformly contacted with a gaseous or liquid acidic substance to neutralize alkalinity therein and provide a pH between 5.8 and 6.2; porous inorganic material treated with a water-soluble zinc salt and having a pH from approximately 7 to 9; absorbent pads; calcium carbonate; Portland cement; activated carbon; alumina; coal residues; recycled molasses serum; in-situ polymerized monomer or monomers containing at least one acidic functional group present in the molecule; water soluble or dispersible materials having colloidal properties in water including silicates, preferably alkali metal silicates, pyrophosphates, preferably alkali metal pyrophosphates, polysaccharides, preferably cellulose derivatives, alginates, or starch; polyvinylpyrrolidone; anhydrous sodium sulfate; citric acid; sodium chloride; sodium or ammonium persulfate and a buffering agent; water absorbent polymers; adhesive-type soluble lignin pelletizing aid; cyclodextrin; thermoplastic polymers, crosslinkable natural gums such as the polygalactomannan gums, xanthan gum, or alginate; pheromone-like attractant substances; a veterinary composition for preventing feline urological syndrome; Plaster of Paris, calcined alkaline earth metal oxides; aluminum sulfate; carbonates, bicarbonates; hydrogen phosphates; benzaldehyde green; rose bengal; certain quaternary ammonium compounds; proprionates; N-alkylpyridinium proprionates; halogenated aromatic hydrocarbons; undecylenic acid; aldehyde derivatives, thiocyanates; carbamates; azo chlorides; modified phenols; oxyalkylated alkylphenols; alkyl sulfate salts; alkylbenzene sulfonate salts; oxyalkylated alcohols; water soluble or dispersible gums and polymers, such as guar gum, micro-crystalline cellulose, pregelatinized starches, methacrylic and acrylic polymers and copolymers, cellulose derivatives (carboxymethyl cellulose, hydroxyethyl cellulose, methyl cellulose), polyvinyl alcohol, polyethylene oxides, carbohydrates, and proteins; camphane derivatives; various aromatic oils such as pine oil, citrus oils; oil of cloves, and cinnamon oil; menthol; camphor; sodium dihydrogen phosphate; potassium dihydrogen phosphate; potassium acid phthalate; cherry pit extract; certain hydroxyamic acids and salts thereof; perfumes; fragrances; vitamin E; chlorine dioxide; sodium bicarbonate; gypsum; sagebrush oil; microencapsulated fragrance or deodorizer; salts of transition metals of Group Ib or Group IIb of the periodic table of the elements; ferrous sulphate hyptahydrate; borax; and p-hydroxybenzoate.

In the last 10 years or so there has developed a new type of cat litter which "captures" the urine in a "ball" or "clump" of litter which can be scooped from the nonwetted litter for easy removal. See for example the following U.S. patents, incorporated herein by reference: 4,685,420 (Stuart); 5,000,115 (Hughes). These so-called "clumping" litters have been based on one or more clays generally having a particle size within the range from about 297 microns to about 2000 microns. Although these clumping litters have been a vast improvement in eliminating the waste before it generates obnoxious odors, these clumping litters still possess one or more undesirable properties or characteristics. These include: high bulk density; poor clumping (poor cohesiveness of the wetted litter); poor urine sorption capacity; excessive wicking or sorption or the urine into the bulk of the litter before the wetted ball of litter is removed.

Thus there is still a need for a superior litter which eliminates or reduces the odors associated with animal urine.

I have now discovered that the sorption capacity of clays which exhibit osmotic swelling can be dramatically increased by admixing therewith a particulate cellulosic material. The sorption capacity of the admixture is synergistically increased as compared to the calculated sorption capacity of the clay and the cellulosic material at their respective concentrations. Furthermore the bulk density of the admixtures are synergistically decreased as compared to the calculated bulk density of the clay and the cellulosic material at their respective concentrations.

Thus it is an object of this invention to provide a method of increasing the sorption capacity of clays which exhibit osmotic swelling.

Another object of this invention is to provide a clumping sorbent having superior sorption capacity and sufficient cohesiveness when wetted with an aqueous liquid, such as urine, to be easily separated from the nonwetted sorbent particles.

Another object of this invention is to provide a clumping cat litter having a bulk density from about 0.54 to about 0.96 g/cc and a sorption capacity greater than 1.0 cc/g, the litter containing sufficient clay which exhibits osmotic swelling to provide sufficient cohesiveness for easy removal of wetted litter from a litter box, and insufficient of such clay to prevent the disintegration of the litter upon aging in water.

These and other objects of the invention will be readily apparent to one skilled in the art as the description thereof proceeds.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The clays which are useful in the methods and sorbents of this invention are smectite-type clays which have a cation exchange capacity of at least 50 milliequivalents per 100 grams of clay which have sufficient of the exchangeable cations being selected from the group consisting of sodium, lithium, and mixtures thereof, such that the clay exhibits osmotic swelling in water.

The structure of the minerals of the smectite group of clay minerals comprises a 3-layer sheet structure wherein a central octahedral layer of principally alumina or magnesia is sandwiched between two tetrehedral layers of principally silica. In the tetrahedral layer, tetravalent Si is sometimes partly replaced by trivalent Al or Fe. In the octahedral sheet, there may be a replacement of trivalent Al by divalent Mg, or of divalent Mg by monovalent lithium atoms. In the smectite clay minerals where an atom of lower positive valence replaces one of higher valence, there results within the clay structure deficit of positive charge, or, in other words, an excess of negative charge. This excess of negative charge is compensated by the adsorption on the layer surfaces of cations which are too large to be accommodated within the interior of the crystal structure.

In the presence of water, the compensating cations on the layer surfaces may be exchanged by other cations when available in solution; hence they are called "exchangeable cations." The total amount of these cations can be determined analytically. This amount, expressed in milliequivalents per 100 gram of dry clay, is called the "cation exchange capacity" (CEC) or the "base exchange capacity" (BEC) of the clay.

In the stack of layers which form a smectite particle, the exchangeable cations are located on each side of each layer in the stack; hence they are present not only on the exterior surfaces of the particle but also in between the layers. When smectite clays are contacted with water or with water vapor, the water molecules penetrate between the layers. This so-called "interlayer swelling" leads to at most a doubling of the dry clay volume when four layers of water are adsorbed. However, for the swelling smectite-type clays useful in this invention, the swelling process continues and an amount of water is imbibed which is many times the volume of the original clay. The additional swelling is a result of the double-layer repulsive forces between the surfaces of the individual particles, which pushes them apart. The swelling is called "osmotic swelling" since the water tends to equalize the high concentration of ions between any two particles and the low concentrations of ions far away from the particle surfaces in the bulk aqueous solution. As a result of this osmotic swelling, the clay/water system becomes a gel or colloidal solution depending on the concentration of the clay.

Thus for the purposes of this invention, a clay which exhibits osmotic swelling in water will have an interlamellar swelling greater than about 10 angtroms.

The preferred smectite clays which exhibit osmotic swelling are selected from the group consisting of montmorillonite, hectorite, beidellite, nontronite, saponite and mixtures thereof, provided that sufficient of their exchangeable cations are sodium cations to effect such osmotic swelling. Most particularly preferred is the montmorillonitic clay found in Wyoming, U.S.A., and variously called Wyoming bentonite or western bentonite.

The smectite clays which exhibit osmotic swelling (hereinafter sometimes referred to as "SCWEOS") when contacted with water, or like aqueous liquid such as urine, immediately swell and commence hydration. As the surface of each particle contacted swells, the sorption rate is rapidly decreased and the interior of the particle sorbs the liquid through a much slower diffusion process. As a result, the aqueous liquid flows to and contacts further particles until the liquid is completely sorbed and immobilized. This results in a low apparent sorption capacity for the SCWEOS which is far less than the ultimate sorption capacity of the SCWEOS if unrestricted entry of the aqueous liquid into the interior of the SCWEOS particle did not occur.

I have now found that the apparent sorption capacity of the SCWEOS can be synergistically increased by mixing with the SCWEOS a cellulosic material wherein the weight ratio of the cellulosic material to the SCWEOS is from about 0.05 to about 3.0. The apparent sorption capacity of the SCWEOS of this invention is less than 1.0 cc/g. Thus by the addition of the cellulosic material to the SCWEOS, the apparent sorption capacity of the mixture is greater than 1.0 cc/g. Preferably the apparent sorption capacity of the mixture is at least 1.25 cc/g.

The cellulosic materials useful in this invention comprise particulate materials derived from various agricultural sources, such as grains, fruits, cotton, vegetables, nuts, trees, grasses, peat, and the like, and include particulate lignocellulosic materials. Representative cellulosic materials from grains include oat hulls, corn cobs, cornstalks, wheat chaf, rice hulls, bagasse, rice bran, and the like. Representative cellulosic materials from fruits include citrus pulp (from lemons, oranges, grapefruits, etc.), apple pulp, grape pulp, and the like. Representative cellulosic materials from cotton include degraded cotton, cotton burns, cottonseed hulls, and the like. Representative cellulosic materials from vegetables include beet pulp, tomato pulp, and the like. Representative cellulosic materials from nuts include peanut shells, walnut shells, pecan shells, almond shells, and the like. Representative cellulosic materials from trees include sawdust, bark, paper, cedar fiber, ground sagebrush, ground kenaf, and the like. Representative cellulosic materials from grasses include alfalfa, hay, straw, and the like.

Preferably the cellulosic material is selected from the group consisting of oat hulls, corn cobs, peanut shells, citrus pulp, beet pulp, paper, cotton burrs, cottonseed hulls, rice hulls, rice bran, peat, and mixtures thereof. Most preferably the cellulosic material is selected from the group consisting of oat hulls, cotton burrs, rice hulls, peat, and mixtures thereof.

The SCWEOS useful in the cat litter sorbents of this invention have a particle size distribution such that at least about 95% of the particles thereof pass through a 2000 micron screen, less than about 10% of its particles pass through a 149 micron screen, and at least about 80% of its particles are retained on a 297 micron screen. Preferably at least about 90% of the particles of the SCWEOS are within the range from about 250 microns to about 2000 microns, i.e., preferably at least 90% of the particles pass through a 2000 micron screen and are retained on a 250 micron screen.

The particle size of the cellulosic material useful in this invention is dependent upon the particle size of the SCWEOS. Thus the cellulosic material must have a particle size distribution that would prevent adverse separation of the particles of cellulosic material and the particles of the SCWEOS. If the cellulosic material and SCWEOS are dry mixed, then the cellulosic material useful in the cat litter sorbents of this invention have a particle size distribution such that at least about 95% of the particles thereof pass through a 2000 micron screen, at least about 65% of its particles are retained on a 297 micron screen, and less than about 10% of its particles pass through a 149 micron screen. Preferably at least about 90% of its particles are within the range from about 250 microns to about 2000 microns.

For other uses of the SCWEOS/cellulosic material dry blends, other particle size distributions may be used. Thus when the SCWEOS is a pulverized clay wherein at least about 90% of the particles thereof are less than 149 microns, the particle size of the cellulosic material should be similar, i.e., at least about 90% of the particles thereof should pass through a 149 micron screen.

Thus in the broadest aspects of the invention, the particle size of the SCWEOS and the cellulosic material need only be such that at least about 95% of their particles be less than about 2000 microns.

When the apparent sorption capacity of the SCWEOS is increased by mixing therewith the cellulosic material and an aqueous liquid, such as water, a surfactant solution, and the like, the particle size distribution of the SCWEOS and the cellulosic material are not as critical since the particles of SCWEOS swell and bind the cellulosic material particles thereto. Upon drying of the mixture, as desired, the particles of the mixture can be separated by sieving or other means to obtain the desired particle size distribution. In this process, when the particles are used as a cat litter, the particles greater than 2000 microns can be crushed and returned to the sieving operation, and the particles less than 149 microns or any other desired lower limit of particle size, such as 250 microns, can be recycled to the mixing operation wherein they are again mixed and contacted with the aqueous liquid.

Thus it is another aspect of this invention to provide a method of preparing a sorbent which comprises mixing a SCWEOS which has a particle size such that at least about 95% of the particles thereof pass through a 2000 micron screen with a particulate cellulosic material having a particle size such that at least about 95% of the particles thereof pass through a 2000 micron screen and an aqueous liquid, wherein the weight ratio of the cellulosic material to the smectite clay is in the range from about 0.05 to about 3.0, adjusting the mixture, such as by drying, to the desired moisture content, and sieving the sorbent to the desired particle size distribution. When the sorbent is used as a cat litter, preferably the sorbent will have a particle size distribution such that at least about 95% of its particles pass through a 2000 micron screen, at least about 80% of its particles are retained on a 297 micron screen, and less than about 10% of its particles pass through a 149 micron screen. The concentration of aqueous liquid should be such that the wet mixture can be easily handled in the mixing equipment utilized. Preferably the aqueous liquid will be present in the wet mixture in an amount from about 10% to about 50% by weight of the wet mixture. The sorbents prepared by this process appear much more homogeneous as compared to the sorbents prepared by dry mixing the SCWEOS with the cellulosic materials.

The aqueous liquid may contain one or more materials to provide the sorbent with additional or enhanced properties not obtainable in the absence of such material or materials. Thus the aqueous liquid may contain a surfactant to enhance the rate of sorption of the sorbent or to further increase the sorption capacity of the sorbent. Either nonionic, anionic, or cationic surfactants may be used. Exemplary surfactants are well known in the chemical arts. The aqueous liquid may contain odorants, bactericides, fungicides, attractants, colorants, and the like materials.

The sorbents of this invention have the property that when the sorbent is wetted with an aqueous liquid, the wetted sorbent has sufficient cohesiveness for removal of the wetted sorbent from the nonwetted sorbent particles. Thus, for instance, in a cat litter box, the sorbent when wetted with urine forms a mass of sorbed, wetted sorbent that can be scooped out or otherwise removed from the litter box. The cohesiveness of the sorbents of this invention is dependent upon the concentration of the SCWEOS in the sorbent. The sorbent should contain a minimum of 30% by weight of the SCWEOS, preferably at least 35% by weight, and most preferably at least 40% by weight. Furthermore, the preferred sorbents of this invention have the property that the wetted sorbent, upon its removal from the nonwetted sorbent, will disintegrate over time when placed in water. When used as a cat litter, this enables the wetted litter to be flushed down a toilet (provided the toilet does not exit into a septic system for treatment). The disintegration of the wetted sorbent or litter is primarily dependent upon the maximum concentration of SCWEOS in the sorbent. Thus the sorbent should contain a maximum concentration of 80% by weight of the SCWEOS, preferably less than about 75%, most preferably not more than about 70%. At concentrations greater than about 80% of the SCWEOS, the lump of wetted sorbent hydrates further into a mass which does not disintegrate in water over time. Thus the clumping cat litter sorbents of this invention will contain from about 30% to about 80% by weight of the SCWEOS, preferably from about 35% to about 75%, and most preferably from about 40% to about 70% by weight.

The preferred sorbents of this invention which comprise a clumping litter box sorbent have a bulk density in the range from about 0.54 g/cc to about 0.96 g/cc, preferably from about 0.60 g/cc to about 0.90 g/cc, and most preferably from about 0.66 g/cc to about 0.90 g/cc. As discussed hereinbefore, the cellulosic material synergistically increases the apparent sorption capacity of the SCWEOS. The apparent sorption capacity of the cat litter sorbents of this invention should be greater than about 1.0 cc water per gram of sorbent, preferably at least about 1.25 cc/g.

In order to obtain the desired bulk density in the clumping litter box sorbent of the invention, there may be mixed with the SCWEOS and the cellulosic material a density control agent. Preferably the density control agent is an inorganic substance which does not exhibit osmotic swelling. Most preferably the density control agent has a bulk density which is intermediate the bulk density of the SCWEOS and the bulk density of the cellulosic material. The most preferred density control agent is a clay or clay-like material which does not exhibit osmotic swelling. Representative clays are smectite clays wherein the concentration of exchangeable divalent or trivalent cations is such that the clay does not exhibit osmotic swelling, such as calcium montmorillonite or bentonite, or which has too low a base exchange capacity to exhibit osmotic swelling. Other clays useful as density control agents are attapulgite, sepiolite, fullers earth, halloysite, illite, mixed layer clays, chlorite, kaolinite, mica, vermiculite, and the like. Clay-like materials which are useful as density control agents include diatomaceous earth, zeolites, wollastonite, talc, perlite, and the like. Other materials such as fly ash, alkaline earth metal carbonates, borates, phosphates, etc. may be used. The density control agent may be a synthetic sorbent such as the sorbents set forth in the following U.S. Patents, incorporated herein by reference: U.S. Pat. Nos. 4,163,674 (Been); 4,183,763 (Omilinsky et al.); 4,264,543 (Valenta); 4,275,684 (Kramer et al.); 4,395,357 (Kramer et al.); 4,724,242 (Vassileff); 4,736,706 (Lang); 4,824,810 (Lang et al.); and 4,925,826 (Hamm et al.).

The particle size of the density control agent is dependent upon the particle sizes of the SCWEOS and the cellulosic material. Thus the density control agent must have a particle size distribution that would prevent adverse separation of the particles of the density control agent from the particles of the SCWEOS and the cellulosic material. Thus the density control agent will have a particle size distribution such that at least 95% of the particles thereof pass through a 2000 micron screen, at least about 80% of its particles are retained on a 250 micron screen, and less than about 10% of its particles pass through a 149 micron screen when the sorbent is prepared by dry mixing. In the broadest aspect of this invention, the density control agent has a particle size such that at least about 95% of the particles thereof pass through a 2000 micron screen.

The bulk density and apparent sorption capacity required in the clumping cat litter sorbents of this invention are obtained by mixing with the desired amount of SCWEOS as set forth hereinbefore sufficient cellulosic material to provide from about 5% to about 70% by weight, preferably from about 5% to about 50% by weight, and most preferably from about 5% to about 30% by weight, and sufficient density control agent to provide from 0% to about 60% by weight, preferably from 0% to about 50%, most preferably from about 5% to about 50% by weight.

In order to more completely describe the invention, the following nonlimiting examples are given. In these examples and throughout this specification, the following abbreviations may be used: BD=compacted bulk density; SC=water sorption capacity; cc=cubic centimeter(s); g=gram(s); lbm=pound. All mesh sizes used in the description of the invention are in terms of U.S. Standard Sieve Series, Fine Series of 1940, i.e., 10 mesh=2000 microns sieve openings, 50 mesh=297 microns, 60 mesh=250 microns, 100 mesh=149 microns. A particle size designated +X indicates the particles were retained on a sieve of size X mesh. A particle size of Y/Z indicates that the particles passed through a sieve of mesh size Y and were retained on a sieve of mesh size Z. A particle size designated -W indicates that the particles all passed through a sieve of mesh size W.

The particle size distribution, the bulk density, and the water sorption capacity of the various materials evaluated in the Examples is set forth in Table A. All percentages throughout the Tables, Examples, and this specification are weight percent. The particle size of the materials was determined using the following procedure: A series of sieves of varying mesh sizes with openings diminishing in size from the top downward were stacked over a solid bottom pan. The materials were placed on a vibrating shaker and shaken for 10 minutes. The weight of material retained on each sieve and in the pan was determined and the % by weight of sample calculated.

Methods are known to measure the compacted bulk density of solids. In these examples, the material was weighed into a 100 cc graduate cylinder, compacted by tapping to constant volume, and measuring the volume of the compacted solids. The apparent sorption capacity for the purposes of describing and claiming this invention, is measured using the following procedure: a measured quantity of the sorbent is weighed into a pre-weighed or tared plastic weighing dish, generally 5.0 grams of sample; distilled water is added dropwise slowly until 2.5 grams (cc) has been added; the wetted sorbent is then covered with additional dry sorbent, generally 5.0 grams; this is aged five (5) minutes to allow for sorption and spreading of the water; thereinafter the weight of the sample not wet by the water is determined by carefully pouring off the dry sample from the wetted sample; the sorption capacity in cc/g is calculated using the equation $$SC = \frac{2.5}{10.0 - (\text{g of non-wetted sample})}$$

TABLE A

| | Particle Size Distribution* % By Weight | | | | Bulk Density | Sorption Capacity | |
|---|---|---|---|---|---|---|---|
| | +10 | 10/50 | 50/100 | −100 | g/cc | cc/g | cc/lbm |
| Cellulosic Material | | | | | | | |
| Beet Pulp | 0 | 80 | 20 | 0 | 0.450 | 1.85 | 840 |
| Citrus Pulp | 0 | 98 | 2 | 0 | 0.526 | 1.43 | 648 |
| Corn Cobs | 0 | 87 | 13 | 0 | 0.376 | 1.25 | 567 |
| Cotton Burrs | 0 | 90 | 10 | 0 | 0.455 | 1.72 | 783 |
| Oat Hulls | 0 | 78 | 22 | 0 | 0.385 | 1.25 | 567 |
| Peanut Shells | 0 | 97 | 3 | 0 | 0.420 | 0.77 | 349 |
| Rice Hulls | 0 | 70 | 28 | 2 | 0.466 | 1.08 | 490 |
| Rice Hulls + 1% Oil | 0 | 74.5 | 24 | 1.5 | 0.449 | 1.14 | 517 |
| Rice Bran | 0 | 98 | 2 | 0 | 0.443 | 1.14 | 517 |
| Peat | 0 | 100 | 0 | 0 | 0.113 | ** | ** |
| Osmotic Swelling Clay | | | | | | | |
| Wyoming Bentonite No. 1 | 0 | 93.1 | 5.4 | 1.5 | 1.143 | 0.84 | 381 |
| Wyoming Bentonite No. 2 | 0 | 86.4 | 7.6 | 6.0 | 1.25 | 0.71 | 324 |
| Wyoming Bentonite No. 3 | 0.1 | 92.5 | 6.1 | 1.3 | 1.12 | 0.625 | 284 |
| Density Control Agent | | | | | | | |
| Attapulgite Clay No. 1 | 0 | 84.5 | 9.1 | 6.4 | 0.617 | 0.91 | 413 |
| Attapulgite Clay No. 2 | 0 | 92.4 | 5.6 | 2.0 | 0.654 | 0.82 | 372 |
| Fuller's Earth | 0 | 72.6 | 22.9 | 4.5 | 0.683 | 0.56 | 252 |

*U.S. Standard Sieve
**Hydrophobic

EXAMPLE A

Clumping cat litter samples were prepared by dry mixing together Wyoming Bentonite No. 1 and either cotton burrs, beet pulp, and corn cobs. The specific samples prepared are set forth in Table I. They were evaluated for bulk density and water sorption capacity. The data obtained are given in Table I.

EXAMPLE B

Clumping cat litter samples were prepared by dry mixing together Wyoming Bentonite No. 2 and various cellulosic materials as indicated in Table II. The specific samples prepared are set forth in Table II. They were evaluated for bulk density and water sorption capacity. The data obtained are given in Table II.

The data in Table I and Table II indicate that these cellulosic materials synergistically increased the sorption capacity and synergistically decreased the bulk density.

TABLE I

| | Cellulosic Material | | | | | |
|---|---|---|---|---|---|---|
| % Wyoming | Cotton Burrs | | Beet Pulp | | Corn Cobs | |
| Bentonite No. 1 | BD g/cc | SC cc/g | BD g/cc | SC cc/g | BD g/cc | SC cc/g |
| 100* | 1.143 | 0.84 | 1.143 | 0.84 | 1.143 | 0.84 |
| 90 | 1.044 | 1.92 | — | — | 0.971 | 1.25 |
| 85 | 0.960 | 2.04 | 0.930 | 1.61 | — | — |
| 80 | — | — | — | — | 0.833 | 1.25 |
| 75 | — | — | — | — | — | — |
| 70 | 0.795 | 2.17 | 0.780 | 1.92 | — | — |
| 60 | — | — | — | — | 0.625 | 1.54 |
| 50 | — | — | 0.658 | 2.00 | — | — |
| 30 | 0.640 | 1.56 | 0.559 | 1.85 | 0.467 | 1.29 |
| 0* | 0.455 | 1.72 | 0.450 | 1.85 | 0.376 | 1.25 |

*Not an example of the invention

TABLE II

| | Cellulosic Material | | | | | | | | | | | |
|---|---|---|---|---|---|---|---|---|---|---|---|---|
| % Wyoming | Oat Hulls | | Rice Hulls | | Rice Hulls(1) | | Citrus Pulp | | Peanut Shells | | Rice Bran | |
| Bentonite No. 2 | BD g/cc | SC cc/g | BD g/cc | SC cc/g | BD g/cc | SC cc/g | BD g/cc | SC cc/g | BD g/cc | SC cc/g | BD g/cc | SC cc/g |
| 100* | 1.25 | 0.71 | 1.25 | 0.71 | 1.25 | 0.71 | 1.25 | 0.71 | 1.25 | 0.71 | 1.25 | 0.71 |
| 90 | 1.05 | 1.43 | — | — | 1.03 | 1.51 | — | — | — | — | — | — |
| 85 | 0.98 | 1.43 | 1.015 | 1.60 | — | — | 0.994 | 1.52 | 0.98 | 1.35 | 1.00 | 1.31 |
| 80 | — | — | 0.927 | 1.75 | 0.895 | 1.72 | — | — | 0.935 | 1.43 | — | — |
| 75 | — | — | — | — | — | — | 0.83 | 1.49 | 0.832 | 1.15 | — | — |
| 70 | — | — | 0.867 | 1.60 | 0.80 | 1.72 | 0.774 | 1.43 | 0.772 | 1.09 | 0.854 | 1.37 |
| 60 | — | — | 0.768 | 1.38 | 0.72 | 1.67 | 0.694 | 1.39 | 0.683 | 1.09 | — | — |
| 50 | 0.59 | 1.43 | 0.676 | 1.48 | 0.65 | 1.53 | 0.617 | 1.30 | 0.612 | 1.02 | 0.694 | 1.43 |
| 30 | 0.485 | 1.33 | — | — | — | — | — | — | — | — | — | — |
| 0* | 0.385 | 1.25 | 0.466 | 1.08 | 0.449 | 1.14 | 0.526 | 1.43 | 0.42 | 0.77 | 0.443 | 1.14 |

(1)These rice hulls contain a coating of 1% mineral oil
*Not an example of the invention

EXAMPLE C

Clumping litter samples were prepared containing either 60% or 70% of Wyoming Bentonite No. 2 and correspondingly either 40% or 30% of the peanut shells and citrus pulp in Table A. Three samples of each mixture were prepared by three different processes, as follows: Method 1-The materials were dry blended; Method 2-The materials were dry blended, mixed with 50% of their combined weight of water, dried, sieved, and the 10/50 fraction obtained; Method 3-Processed as in Method 2, except that the water, before addition to the dry mix, was mixed with 2% by weight of a surfactant (Kenamine BQ-9742C). The samples were evaluated for bulk density and water sorption capacity. The data obtained are given in Table III.

The data indicated that the bulk density is decreased and the sorption capacity is increased when the mixtures are wet processed, most especially when Method 3 is used to prepare the samples. Additionally, when wet processed the litter samples appear "homogeneous" rather than as a physical mixture and the samples are aesthetically pleasing.

TABLE III

| Cellulosic Material, % | Method 1 | | Method 2 | | Method 3 | |
|---|---|---|---|---|---|---|
| | BD g/cc | SC cc/g | BD g/cc | SC cc/g | BD g/cc | SC cc/g |
| Citrus Pulp, 30 | 0.774 | 1.43 | 0.752 | 1.47 | 0.688 | 1.67 |
| Citrus Pulp, 40 | 0.694 | 1.39 | 0.666 | 1.39 | 0.615 | 1.59 |
| Peanut Shells, 30 | 0.772 | 1.08 | 0.687 | 1.11 | 0.675 | 1.25 |
| Peanut Shells, 40 | 0.683 | 1.08 | 0.605 | 1.03 | 0.597 | 1.33 |

EXAMPLE D

Un-ground crude oat hulls were fractionated and the 10/50 mesh particles were evaluated for bulk density and water sorption capacity. The bulk density was 0.378 g/cc and the sorption capacity was 1.18 cc/g. This 10/50 fraction was mixed with an equal weight of Wyoming Bentonite No. 2 and evaluated. The bulk density was 0.54 g/cc and the water sorption capacity was 1.33 cc/g. The wetted lump had excellent cohesiveness and disintegrated when aged in water.

EXAMPLE E

Oat hulls which had been pelletized into pellets of ¼" diameter were crushed and evaluated as in Example D. The bulk density was 0.413 g/cc and their sorption capacity was 0.714 cc/g. In mixture with 50% by weight of Wyoming Bentonite No. 2, the bulk density was 0.627 g/cc and the sorption capacity was 1.18 cc/g. The wetted lump had excellent cohesiveness and disintegrated when aged in water.

EXAMPLE F

Cotton burrs which had been pelletized into pellets of about 5/16" diameter were crushed and evaluated as in Example D. The bulk density was 0.408 g/cc and the water sorption capacity was 1.11 cc/g. In mixture with 50% by weight of Wyoming Bentonite No. 2, the bulk density was 0.613 g/cc and the sorption capacity was 1.03 cc/g. The wetted lump had excellent cohesiveness and disintegrated when aged in water.

EXAMPLE G

Various mixtures of Wyoming Bentonite No. 2, the Rice Hulls of Table A, and either the attapulgite or Fuller's earth of Table A were prepared by dry mixing. The specific samples prepared are set forth in Table IV. These samples were evaluated for bulk density and sorption capacity in comparison with samples which are not examples of the invention. The data obtained are given in Table IV.

EXAMPLE H

Mixtures of Wyoming Bentonite No. 3, the peat of Table A, and Attapulgite No. 2 were prepared by dry mixing. The specific samples are set forth in Table V. These samples were evaluated for bulk density and water sorption capacity. The data obtained are given in Table V.

TABLE IV

| Test No. | %, Wyoming Bentonite No. 2 | Cellulosic Material, % | Density Control Agent, % | Density g/cc | Bulk Sorption Capacity | |
|---|---|---|---|---|---|---|
| | | | | | cc/g | cc/lbm |
| 1* | 100 | None, 0 | None, 0 | 1.25 | 0.71 | 324 |
| 2* | 0 | Rice Hulls, 100 | None, 0 | 0.466 | 1.08 | 490** |
| 3* | 0 | None, 0 | Fuller's Earth, 100 | 0.683 | 0.56 | 252** |
| 4* | 0 | None, 0 | Attapulgite, 100 | 0.617 | 0.91 | 413** |
| 5* | 55 | None, 0 | Attapulgite, 45 | 0.843 | 0.89 | 403 |
| 6* | 25 | None, 0 | Attapulgite, 75 | 0.671 | 0.83 | 378 |
| 7* | 32.5 | None, 0 | Fuller's Earth, 67.5 | 0.842 | 0.89 | 403 |
| 8 | 70 | Rice Hulls, 30 | None, 0 | 0.820 | 1.29 | 586 |
| 9 | 72.5 | Rice Hulls, 27.5 | None, 0 | 0.845 | 1.86 | 846 |
| 10* | 23.75 | Rice Hulls, 5 | Attapulgite, 71.25 | 0.658 | 0.82 | 371** |
| 11 | 57.5 | Rice Hulls, 10 | Attapulgite, 32.5 | 0.824 | 1.28 | 582 |
| 12 | 70 | Rice Hulls, 20 | Attapulgite, 10 | 0.874 | 1.67 | 757 |
| 13 | 65 | Rice Hulls, 20 | Attapulgite, 15 | 0.832 | 1.29 | 586 |
| 14 | 50 | Rice Hulls, 20 | Attapulgite, 30 | 0.725 | 1.08 | 491 |
| 15* | 25 | Rice Hulls, 20 | Attapulgite, 55 | 0.619 | 0.80 | 363** |
| 16 | 45 | Rice Hulls, 10 | Fuller's Earth, 45 | 0.842 | 1.18 | 534 |
| 17 | 60 | Rice Hulls, 20 | Fuller's Earth, 20 | 0.831 | 1.30 | 590 |

*Not an example of the invention.
**Very poor cohesion of the wetted lump.

TABLE V

| % Wyoming Bentonite No. 3 | % Peat | % Attapulgite No. 2 | Bulk Density g/cc | Sorption Capacity | |
|---|---|---|---|---|---|
| | | | | cc/g | cc/lbm |
| 54.5 | 7.3 | 38.2 | 0.648 | 1.33 | 605 |
| 70 | 10 | 20 | 0.579 | 1.59 | 721 |
| 70 | 5 | 25 | 0.747 | 1.18 | 534 |
| 80 | 5 | 15 | 0.810 | 1.47 | 668 |

What is claimed is:

1. A method of enhancing the sorption capacity of a smectite clay which exhibits osmotic swelling and which has a particle size such that at least about 95% of its particles pass through a 2000 micron screen which comprises mixing with the smectite clay a particulate cellulosic material having a particle size distribution such that at least about 95% of its particles pass through a 2000 micron screen, wherein the weight ratio of the cellulosic material to the smectite clay is in the range from about 0.05 to about 3.0.

2. The method of claim 1 wherein the smectite clay has a particle size distribution such that at least about 80% of its particles are retained on a 297 micron screen and less than about 10% of its particles pass through a 149 micron screen, and wherein the cellulosic material has a particle size distribution such that at least about 65% of tis particles are retained on a 297 micron screen and less than about 10% of its particles pass through a 149 micron screen.

3. The method of claim 1 or 2 wherein the cellulosic material is selected from the group consisting of oat hulls, corn cobs, peanut shells, citrus pulp, beet pulp, paper, cotton burrs, cottonseed hulls, rice hulls, rice bran, peat and mixtures thereof.

4. A clumping litter box sorbent which when wetted with urine has sufficient cohesiveness for removal of the lump of wetted litter from a litter box which comprises from about 30% to about 80% of a smectite clay which exhibits osmotic swelling and which has a particle size distribution such that at least 95% of its particles pass through a 2000 micron screen, at least about 80% of its particles are retained on a 297 micron screen, and less than about 10% of its particles pass through a 149 micron screen, from about 5% to about 70% of a particulate cellulosic material having a particle size distribution such that at least about 95% of its particles pass through a 2000 micron screen, at least about 65% of its particles are retained on a 297 micron screen, and less than about 10% of its particles pass through a 149 micron screen, and from about 0% to about 60% of a density control agent having a particle size distribution such that at least about 95% of its particles pass through a 2000 micron screen, at least about 80% of its particles are retained on a 250 micron screen, and less than about 10% of its particles pass through a 149 micron screen, wherein the concentration of the smectite clay, cellulosic material, and density control agent are such that the sorbent has a bulk density in the range from about 0.54 to about 0.96 g/cc and an apparent sorption capacity greater than about 1.0 cc/g, wherein the concentration of the smectite clay is such that upon wetting the sorbent the cohesiveness of the lump of wetted sorbent is sufficient to allow its removal from a litter box, and wherein the concentration of the smectite clay is insufficient to prevent the lump of wetted sorbent from disintegrating in water.

5. The sorbent of claim 4 wherein the cellulosic material is selected from the group consisting of oat hulls, corn cobs, peanut shells, citrus pulp, beet pulp, paper, cotton burrs, cottonseed hulls, rice hulls, rice bran, peat, and mixtures thereof.

6. The sorbent of claim 4 or 5 wherein the density control agent is an inorganic substance which does not exhibit osmotic swelling.

7. The sorbent of claim 4 or 5 wherein the density control agent has a bulk density intermediate the bulk density of the smectite clay and the cellulosic material.

8. The sorbent of claim 4 or 5 wherein the density control agent is a clay which does not exhibit osmotic swelling.

9. The sorbent of claim 4 or 5 wherein the concentration the cellulosic material is from about 5% to about 30%, and the concentration of the density control agent is from 0% to about 50%.

10. In a method of cleaning an animal litter box and reducing litter box odors wherein there is added to a litter box a clumping sorbent which is capable of agglomerating upon contact with a liquid animal dross to form an agglomerated mass of sufficient size and of sufficient cohesive strength to allow physical removal of the agglomerated mass from the litter box, the sorbent is contacted with the liquid dross to form the agglomerated mass of the sorbent, and the agglomerated mass is removed from the litter box, the improvement which comprises utilizing as the clumping sorbent the sorbent of Claims 4 or 5.

11. The method of claim 10 wherein the density control agent is an inorganic substance which does not exhibit osmotic swelling.

12. The method of claim 10 wherein the density control agent has a bulk density between the bulk density of the smectite clay and the cellulosic material.

13. The method of claim 10 wherein the density control agent is a clay which does not exhibit osmotic swelling.

14. A method of preparing a clumping litter box sorbent which when wetted with urine has sufficient cohesiveness for removal of the lumps of wetted litter from a litter box containing the litter which comprises mixing together from about 30% to about 80% by weight of a smectite clay which exhibits osmotic swelling and which has a particle size such that at least about 95% of the particles thereof pass through a 2000 micron screen, from about 5% to about 70% by weight of a cellulosic material having a particle size such that at least about 95% of the particles thereof pass through a 2000 micron screen, from 0% to about 60% by weight of a density control agent having a particle size such that at least 95% of the particles thereof pass through a 2000 micron screen, and an aqueous liquid, adjusting the mixture to the desired moisture content, and sieving the mixture to obtain a sorbent which has a particle size distribution such that at least about 95% of its particles pass through a 2000 micron screen, at least about 80% of its particles are retained on a 297 micron screen, and less than about 10% of its particles pass through a 149 micron screen, wherein the minimum concentration of the smectite clay is such that upon wetting the sorbent the cohesiveness of the lump of wetted sorbent is sufficient to allow its removal from a litter box, wherein the maximum concentration of the smectite clay is insufficient to prevent the lump of wetted sorbent from disintegrating in water, and wherein the sorbent has a bulk density in the range from about 0.54 g/cc to about 0.96 g/cc and an apparent sorption capacity greater than about 1.0 cc/g.

15. The method of claim 14 wherein the smectite clay has a particle size distribution such that at least about 80% of its particles are retained on a 297 micron screen and less than about 10% of its particles pass through a 149 micron screen, wherein the cellulosic material has a particle size distribution such that at least about 65% of its particles are retained on a 297 micron screen and less than about 10% of its particles pass through a 149 micron screen, wherein the density control agent has a particle size distribution such that at least about 65% of its particles are retained on a 297 micron screen and less than about 10% of its particles pass through a 149 micron screen.

16. The method of claim 14 or 15 wherein the cellulosic material is selected from the group consisting of oat hulls, corn cobs, peanut shells, citrus pulp, beet pulp, paper, cotton burrs, cottonseed hulls, rice hulls, rice bran, peat, and mixtures thereof, and wherein the density control agent is an inorganic substance which does not exhibit osmotic swelling.

* * * * *